2 Sheets--Sheet 1.

W. H. WAKEMAN.
Improvement in Fruit-Gatherers.

No. 132,190. Patented Oct. 15, 1872.

Witnesses.
C. Hadley.
A. J. Cornell.

Inventor.
W. H. Wakeman,
Per Burridge & Co.
Attys.

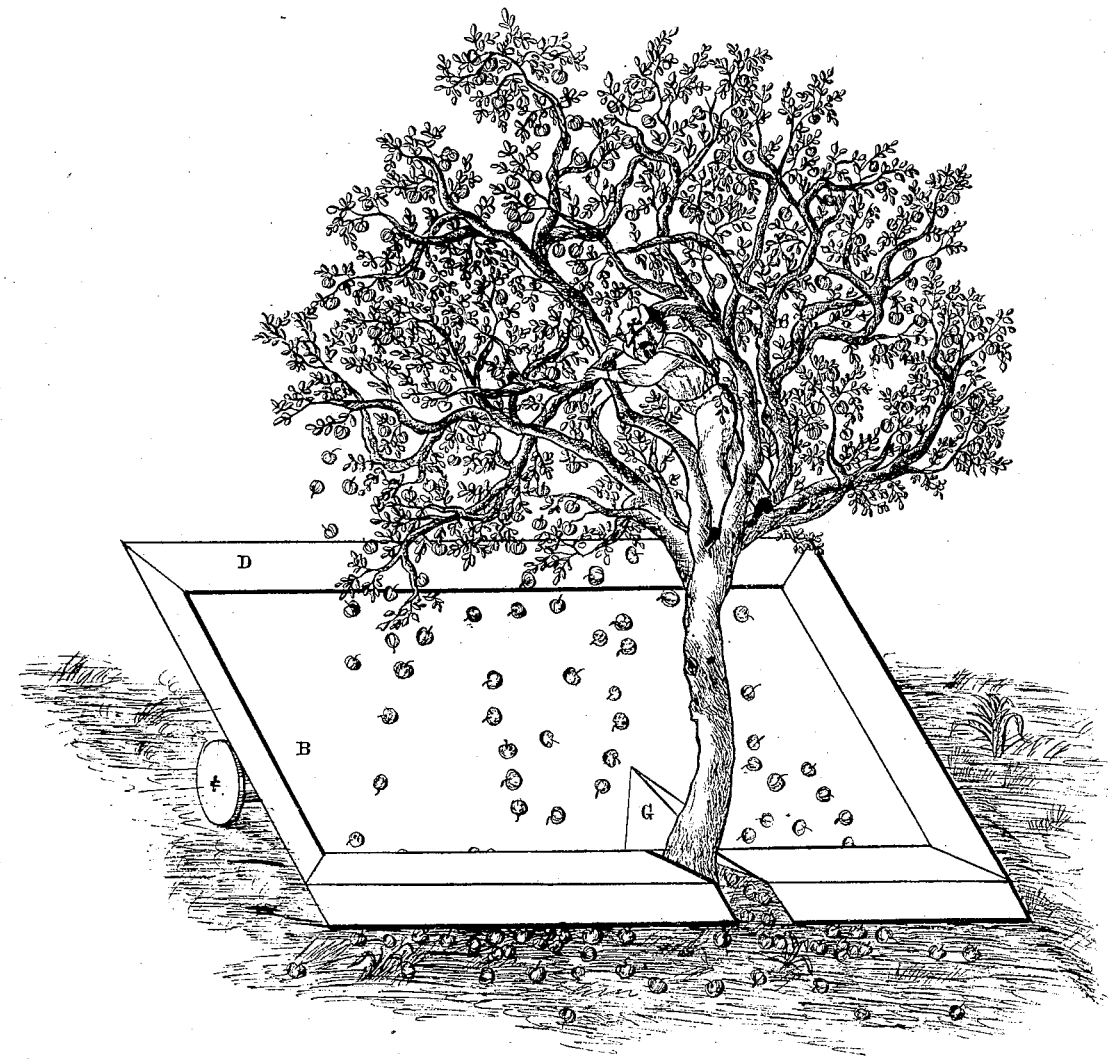

UNITED STATES PATENT OFFICE.

WILLIAM H. WAKEMAN, OF NORTH FAIRFIELD, OHIO.

IMPROVEMENT IN FRUIT-GATHERERS.

Specification forming part of Letters Patent No. 132,190, dated October 15, 1872.

*To all whom it may concern:*

Figure 1:
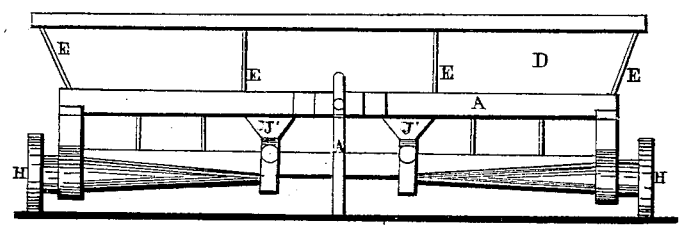
Figure 2:
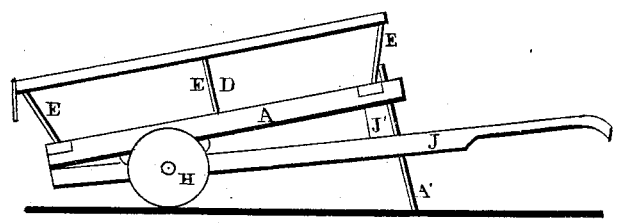
Figure 3:
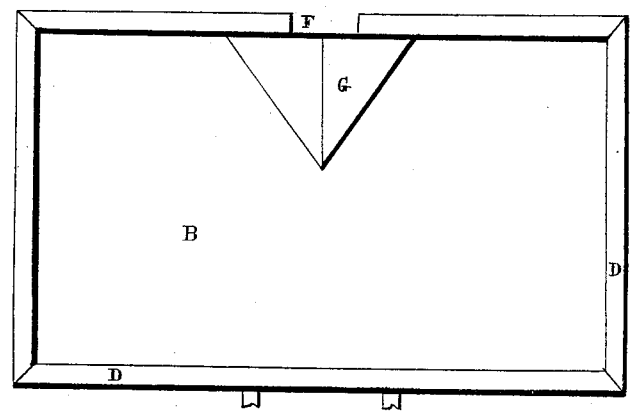
Figure 4:
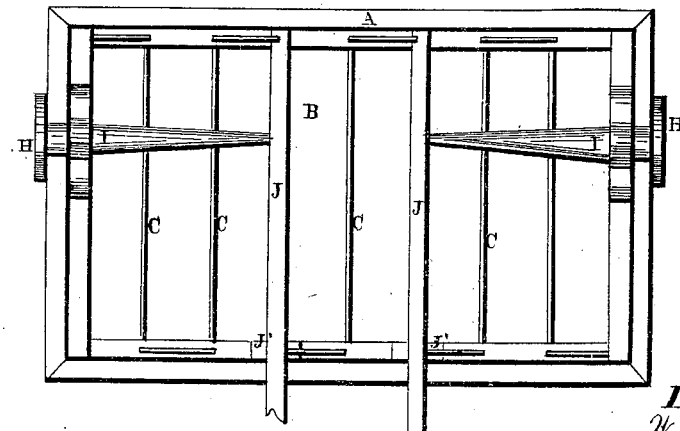

Be it known that I, W. H. WAKEMAN, of North Fairfield, in the county of Huron and State of Ohio, have invented a certain new and Improved Fruit-Gatherer, of which the following is a full and complete description:

Figure 1 is a rear end view of the fruit-gatherer; Fig. 2 is a side view; Fig. 3 is a plan view; Fig. 4 is a view of the under side; and Fig. 5 is a view showing the application of the invention.

Like letters of reference refer to like parts in the several views.

The nature of this invention relates to a device for gathering fruit; and which device consists of an inclined apron or bed mounted upon wheels, which is adjusted around under the tree and the fruit thereon shaken down upon it, which rolls off the inclined apron onto the ground. By this device the fruit is gathered without being bruised and in as good condition as when picked by hand.

The construction and operation of the above said fruit-gatherer is as follows: On a frame, A, Fig. 1, is stretched a sheet of canvas, B, forming a broad plain surface supported transversely by the cords C, Fig. 4, which shows an under-side view of the apron and frame. Around the apron, and in contact therewith, is arranged a guard, D, Figs. 1 and 2, having an outward slant. Said guard is also made of canvas, and is supported in position by the standards E. In the front end of the guard is made an opening, F, for the admission of the body of the tree under which the gatherer may be used. At that particular point an elevation, G, Fig. 3, is formed, the purpose of which will presently be shown. The lower edge of the front part of the guard is not fastened down to the frame, but on the contrary is some four inches above it, so that the fruit falling upon the apron will run under it onto the ground. The above-described frame and apron are mounted upon a pair of wheels, H, of which I are the axles, having their bearings in the frame, as shown. J shows one of a pair of handles whereby the gatherer is pushed about from place to place, as from tree to tree. The front ends of said handles are secured directly to the front rail of the frame, whereas the hind parts are secured to the rear rail by the interposition of the studs J', whereby the rear ends of the handles are dropped some inches so as to bring them in easy reach of the hands of the operator.

The application of the above-described device for the purpose specified is as follows: It is adjusted under the tree so as to bring the body thereof in the opening F, against which the elevated part G leans. The rear side of the frame is tilted up so far as to cause the front side to rest upon the ground, thereby giving an inclination to the apron from the rear side downward. This position of the frame is maintained by the standard A'. The gatherer, when thus adjusted to the tree, is shown in Fig. 5. A person now mounts the tree and therefrom shakes the fruit, which falls upon the apron, from which it rolls down and escapes therefrom to the ground, under the edge of the front guard, through the opening referred to. The raised part G prevents the fruit from lodging against the body of the tree, as it will roll away therefrom in consequence of its incline to the apron. The fruit, as it falls upon the apron, receives no injury by the fall, as the apron is soft and elastic; hence the fruit is sound when gathered from the ground onto which it rolls from the apron, as above said.

When the fruit is gathered from one tree, the apparatus is then wheeled off to another. For this purpose the standard A' is shortened up so as to bring the handles within easy reach of the attendant, and in which position the apron will be nearly level.

What I claim as my invention, and desire to secure by Letters Patent, is—

A fruit-gatherer consisting of a rectangular frame, A, independent wheels and axles H I, canvas or textile bottom B, guard D with fruit-discharging apertures, as and for the purpose substantially set forth.

WILLIAM H. WAKEMAN.

Witnesses:
ALEXANDER C. TAYLOR,
NICHOLAS BURCH.